(12) United States Patent  (10) Patent No.: US 8,365,943 B2
Bentley  (45) Date of Patent: Feb. 5, 2013

(54) CELLULOSE BASED RECYCLABLE CONTAINER

(75) Inventor: Kevin William Bentley, Fort Valley, GA (US)

(73) Assignee: Recycool, Inc., Byron, GA (US)

( * ) Notice: Subject to any disclaimer, the term of this patent is extended or adjusted under 35 U.S.C. 154(b) by 387 days.

(21) Appl. No.: 12/422,725

(22) Filed: Apr. 13, 2009

(65) Prior Publication Data

US 2010/0258574 A1 Oct. 14, 2010

(51) Int. Cl.
*B65D 81/38* (2006.01)
*A45C 11/20* (2006.01)

(52) U.S. Cl. ............... 220/592.2; 220/592.26; 206/545

(58) Field of Classification Search ............ 220/592.09, 220/592.1, 592.2, 592.25, 592.26; 206/545, 206/523, 524
See application file for complete search history.

(56) References Cited

U.S. PATENT DOCUMENTS

| 3,910,550 | A | * | 10/1975 | Nelson ........................... 251/144 |
| 5,062,527 | A | | 11/1991 | Westerman |
| 5,247,747 | A | * | 9/1993 | Grey et al. ...................... 53/472 |
| 5,582,343 | A | | 12/1996 | Dalvey |
| 5,996,366 | A | * | 12/1999 | Renard ........................... 62/256 |
| 6,164,526 | A | | 12/2000 | Dalvey |
| 6,168,040 | B1 | * | 1/2001 | Sautner et al. ............. 220/592.1 |
| 6,244,458 | B1 | * | 6/2001 | Frysinger et al. ........ 220/592.09 |
| 6,582,124 | B2 | * | 6/2003 | Mogil ........................... 383/110 |
| 6,618,868 | B2 | * | 9/2003 | Minnick ........................... 4/498 |
| 6,631,803 | B2 | | 10/2003 | Rhodes et al. |
| 6,736,309 | B1 | | 5/2004 | Westerman et al. |
| 6,837,420 | B2 | | 1/2005 | Westerman et al. |
| 6,868,982 | B2 | * | 3/2005 | Gordon .................... 220/592.23 |
| 6,899,229 | B2 | * | 5/2005 | Dennison et al. ............. 206/583 |
| 6,971,539 | B1 | * | 12/2005 | Abbe ........................ 220/592.13 |
| 7,000,962 | B2 | * | 2/2006 | Le ..................................... 294/15 |
| 7,153,025 | B1 | * | 12/2006 | Jackson et al. ................... 383/2 |
| 7,392,931 | B2 | | 7/2008 | Issler ............................. 229/145 |
| 7,807,773 | B2 | * | 10/2010 | Matsuoka et al. ............. 528/272 |
| 2006/0289135 | A1 | * | 12/2006 | Grant et al. .................... 162/125 |
| 2007/0187416 | A1 | * | 8/2007 | Maxson .................... 220/592.26 |
| 2007/0295735 | A1 | * | 12/2007 | Futernick ................. 220/592.26 |

OTHER PUBLICATIONS

Eco-cooler, http://eco-fiber.com/cooler.html.
Cooler on the Go!, http://coolergogo.com/.
Planet Cooler, http://www.coolerconcepts.com/planetcooler.html.

* cited by examiner

*Primary Examiner* — J. Gregory Pickett
*Assistant Examiner* — Ernesto Grano
(74) *Attorney, Agent, or Firm* — Smith Risley Tempel Santos LLC; Matthew T. Hoots

(57) ABSTRACT

Disclosed is a portable cooler device comprised of recyclable materials. Some embodiments of the device comprise components constructed entirely of, or substantially of, cellulose. Other embodiments may be comprised of recyclable materials not classified as cellulose such as, but not limited to, cotton, bamboo, hemp, or other natural fibers. The specific percentages of recycled and/or recyclable content are not limiting factors for the invention; however, most embodiments have consistent materials of construction such that the entire device may be recycled in a single recycling process without the need for deconstruction. Further, if not recycled, embodiments are operable to biodegrade within a reasonable amount of time when exposed to the elements in a landfill. Typical embodiments are comprised of an inner shell, an outer shell having an integrally hinged lid, and pressed cellulose insulating boards sandwiched between the shells.

17 Claims, 9 Drawing Sheets

Fig. 3A
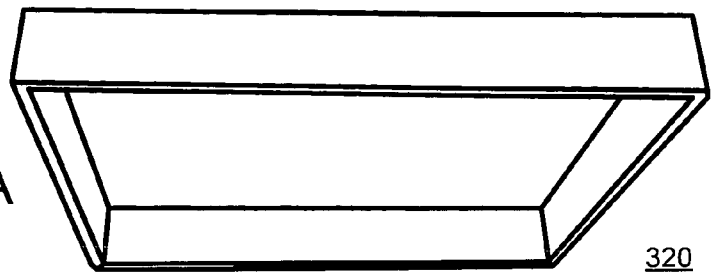
320
Fig. 3B
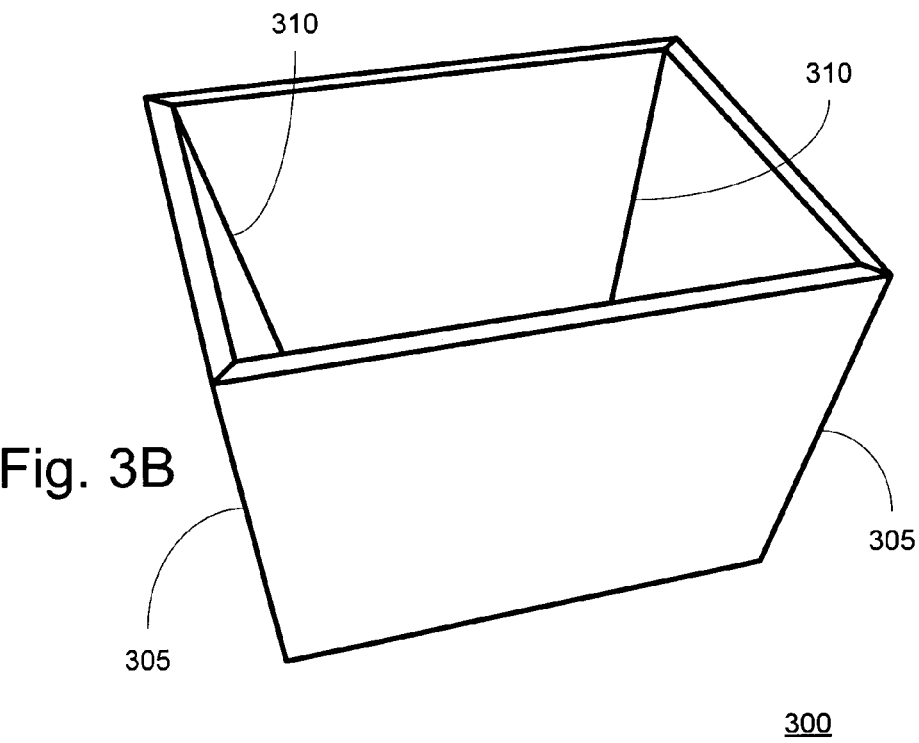
310
310
305
305
300
Fig. 3

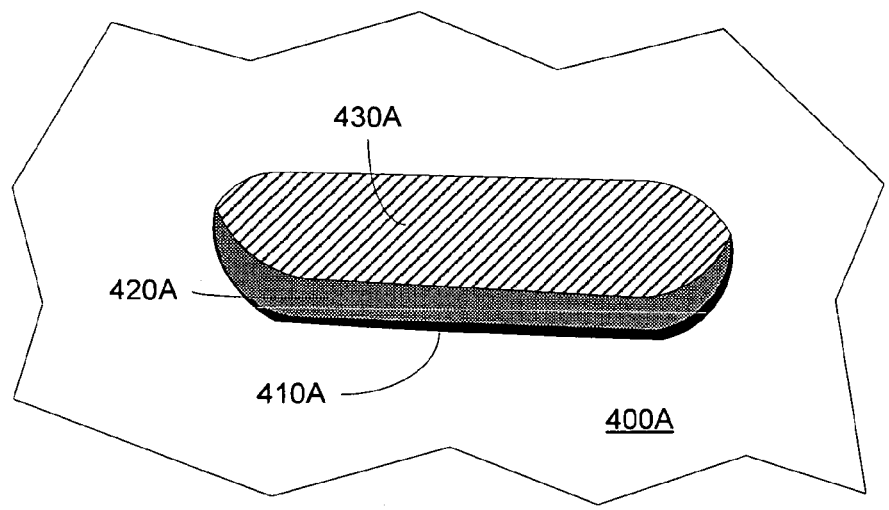
Fig. 4A
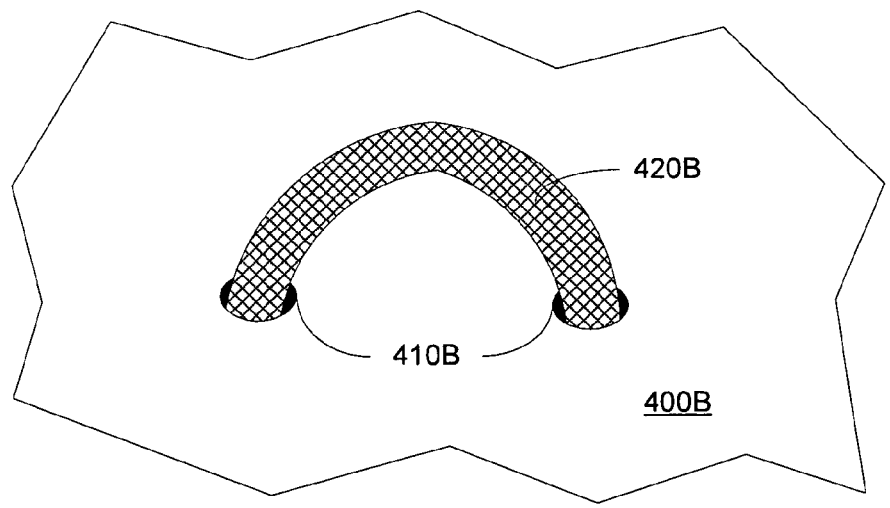
Fig. 4B
Fig. 4

600

CELLULOSE BASED RECYCLABLE CONTAINER

BACKGROUND

A portable icebox, or what is commonly called a "cooler," is an apparatus that has become commonplace in today's society. A cooler, generally, is any container operable to prevent, or at least substantially retard, the transfer of energy into, or out of, the contents contained within a space defined by its walls. When one thinks about it, the applications for a container having the requisite properties to keep its contents at a given temperature, especially a cold temperature, are seemingly without limit.

In years past, portable coolers often took the form of a box with a lid, hinged or otherwise, having walls comprised of tin, aluminum, or some other metallic material of construction that could be fashioned around a rigid component having some modicum of insulating value, such as wood. The result was a somewhat waterproof shell fastened around an otherwise wooden box such that ice, water, and any contents having a requirement to be kept cold could be transported or stored without spoiling.

While the basic concept, and primary purpose, of a portable cooler hasn't changed much, the construction and preferred materials of construction certainly have. With the availability of Styrofoam (i.e., expanded polystyrene), the waterproofing aspects and insulating aspects of a cooler can be had with a single material of construction. Styrofoam is easily molded and inexpensive to the point that a user doesn't think twice about discarding the cooler after its use. Of course, the lack of durability for Styrofoam coolers greatly increases the probability that a user will, in fact, discard the product after only one or two uses. Further, presumably due to cost considerations, Styrofoam coolers usually have separable tops that are not hinged to the main body of the cooler, thus having a propensity to lose their tops and, simultaneously, their usefulness. At the inevitable point that a Styrofoam cooler has outlived its short, useful life, therein lays the main problem—responsible disposal.

From a technical standpoint, Styrofoam is recyclable. From practical and economical standpoints, however, Styrofoam products cannot be recycled. With current recycling technology, the cost to recycle Styrofoam products exceeds the value of the reclaimed raw material. Further, the process of recycling some Styrofoam products may cause the environmentally detrimental release of CFCs. Consequently, very few recycling programs, municipal or private, bother to accept Styrofoam products. As a result, Styrofoam products, such as Styrofoam coolers, find their way into landfills after being discarded and such is not desirable as Styrofoam is not biodegradable. Therefore, what is needed in the art is an inexpensive portable cooler being comprised of an environmentally responsible material that is accepted in a majority of community recycling programs. Further, what is needed in the art is a portable cooler comprised of a material that is generally known to biodegrade during prolonged exposure to the elements, should the cooler not be recycled by its user.

At the price point of a Styrofoam cooler, but far more environmentally suitable for disposal, is what amounts to a basic, single walled box structure made of waxed corrugated cardboard. Comprising an inexpensive, single use cooler device out of waxed cardboard is well known in the art. Similarly, a cooler device comprising a cardboard box with a separable waterproof liner component is also well known in the art. Promotional companies seeking to provide a cooler product with customized artwork and logos for specialized events often make use of printed cardboard boxes having either a wax treatment, or some other surface treatment, or separable liner for added resistance to water egress. The problem with such products, however, is that by the virtue of their single layer cardboard walls and/or thin separable liner, they lack durability and are prone to failure when used multiple times. Also, the insulating capabilities of typical cardboard coolers are inadequate as the R-factor associated with a given cooler is limited by the cardboard used in construction. As the overall thickness and design of the corrugated cardboard used to construct the box is limited by manufacturing and cost constraints, coolers made of a single layer of cardboard can only minimally inhibit the transfer of energy. Therefore, what is needed in the art is a cooler design that employs cellulose based recyclable materials of construction, or other recyclable materials of construction, and offers a means for providing R-values that exceed that of single walled cardboard based coolers already known in the art. Further, what is needed in the art is a cooler made of recyclable, cellulose based materials of construction, or other recyclable materials of construction, having an overall durability that makes it suitable for repeated use.

At the other end of the spectrum from Styrofoam coolers and basic corrugated boxes are the more expensive, and durable, plastic coolers with foam based insulating cores. Coolers that fall into this class are generally purchased for prolonged, repeated use and are available in a range of sizes and shapes with myriad features. Consequently, plastic coolers with all the associated features and designs are predictably expensive. Also, such coolers are not practical to customize with artwork for special events or promotions as the hard plastic exteriors are not well suited for printing. Further, while some types of plastics are accepted by typical recycling programs, plastic coolers are generally comprised of plastic types that are not considered economical to recycle. Moreover, plastic coolers known in the art are not biodegradable and, even if the components comprising a plastic cooler are technically, if not practically, recyclable, doing so would require deconstruction and separation of the components prior to transferring each to disparate recycling processes. Therefore, what is needed in the art is a portable cooler comprised of materials that are not only readily accepted by recycling programs, but are also easily customizable and printable. Further, what is needed in the art is a portable cooler having all components comprised of materials that may be recycled in a single recycling process.

Prior art for portable coolers are inadequate. They do not provide for a durable product that can withstand repeated uses, substantially inhibit energy transfer, be recycled by most recycling programs, and biodegrade if exposed to the elements for a prolonged time. The cellulose based recyclable container provides for these needs in the art, as well as other needs in the art, and is described in detail herein.

BRIEF SUMMARY

A cellulose based container that is suitable for providing a level of thermal insulation is presented. Although exemplary containers are referred to as ice boxes or coolers throughout this description, it should be understood that the container may also be utilized to keep items warm or simply stable. The disclosed recyclable container is a portable cooler device comprised of recyclable materials. Some embodiments comprise components constructed entirely of, or substantially of, cellulose. Other embodiments may be comprised of recyclable materials not classified as cellulose such as, but not limited to, cotton, bamboo, hemp, or other natural fibers.

Unlike wax treated corrugated boxes already known in the art, a cellulose based recyclable container is operable to provide insulating factors that exceed those associated with single layer construction techniques. By combining an outer shell and inner shell with a substantially rigid, cellulose based pressed board or bat sandwiched in between, a cellulose based portable container may be provided in configurations useful for prolonged maintenance of the temperature of contents stored within its defined space. Further, and unlike plastic and foam core portable cooler designs, a cellulose based portable container may be recycled by most community based, or private, recycling programs without the need for deconstruction and separation of it components. Also, a cellulose based portable container in lieu of being recycled, whether comprised of cellulose or some other natural fiber, may be reasonably expected to biodegrade with prolonged exposure to natural elements in a landfill. Additionally, because embodiments of a cellulose based portable container are comprised of cardboard inner and outer shells and, further, are easily constructed via conversion techniques readily known in the art, shapes and artwork for various embodiments are easily customizable.

One embodiment of a cellulose based portable container is generally comprised of an inner shell having water resistant properties, an outer shell with a communicable lid, and insulating boards. Each component of such an embodiment is primarily constructed from a cellulose based material such as, but not limited to, corrugated cardboard, recycled newspaper, craft board, or the like. As a result, the entire product, although comprising multiple components, may be recycled in a typical community based recycling program.

Each component of the exemplary embodiment may be designed and converted from "sheet" forms per techniques currently known in the art. The outer and inner shell components may be cut from a flat sheet of cardboard, for instance, and creased such that each may communicate with the other to form a box-like shape with an integral lid. Likewise, the insulating board components may be cut in panels from a larger sheet of pressed cellulose such that each panel is operable to fit between the outer surface of the inner shell and the inner surface of the outer shell when said shells are in communication. Notably, the components of some embodiments of a cellulose based portable container may be comprised of 100% recycled and/or 100% recyclable materials, but such is not required of all embodiments of a cellulose based portable container and, therefore, specific percentages of recycled, recyclable or reclaimed material should not be construed to limit the scope of that which is claimed.

BRIEF DESCRIPTION OF THE SEVERAL VIEWS OF THE DRAWING

FIG. 3A is a perspective view of a separable lid used by some embodiments of a cellulose based portable container.

FIG. 3B is a perspective view of an embodiment of a cellulose based portable container having a tapered construction operable to facilitate stacking.

FIG. 4A is a perspective view of a cut out handle construction included in some embodiments of a cellulose based portable container.

FIG. 4B is a perspective view of an alternative handle design included in some embodiments of a cellulose based portable container, being comprised of a material in the form of a rope.

DETAILED DESCRIPTION OF VARIOUS EMBODIMENTS

Figure 1A:
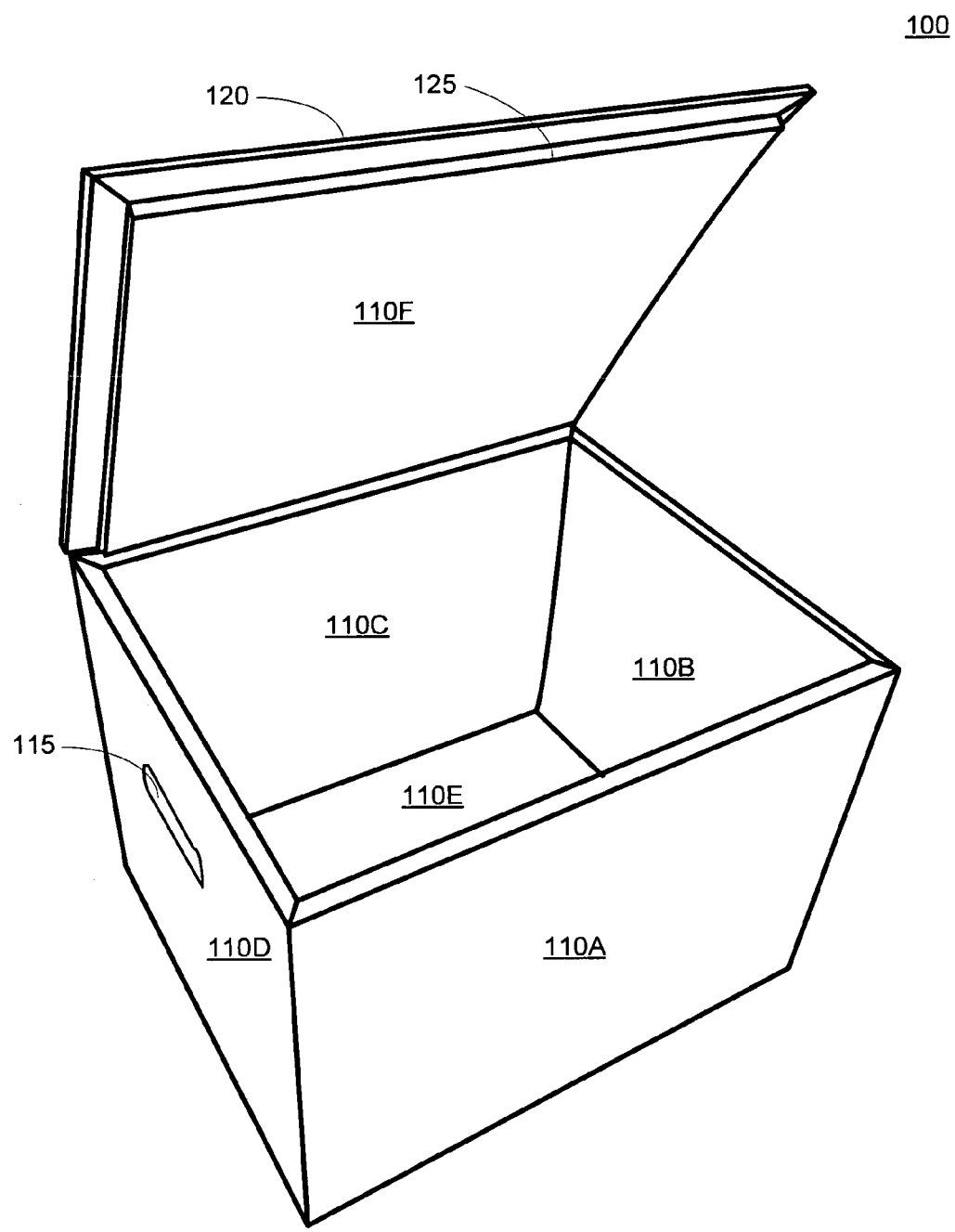
FIG. 1A is a perspective, front view of one embodiment of a cellulose based portable container having an integrally hinged lid and cut out handles.

The present disclosure of various embodiments of a container, as well as features and aspects thereof, is directed towards providing a portable container operable to substantially retard the transfer of energy from contents contained within its defined space, and/or the transfer of energy from outside its defined space, i.e. a cooler or thermally insulated container, and being comprised of multiple layers with each layer constructed from substantially similar materials such that the entire device is classified as biodegradable or recyclable without a requirement for deconstruction.

Generally, a cellulose based recyclable container is a portable device comprised of recyclable materials. Some embodiments comprise components constructed entirely of, or substantially of, cellulose. Other embodiments may be comprised of recyclable materials not classified as cellulose such as, but not limited to, cotton, bamboo, hemp, or other natural fibers. Although embodiments may be used to maintain any temperature level, temperature range or simply to slow temperature decay or escalation, embodiments will generally be referred to as a cooler.

Unlike wax treated corrugated boxes already known in the art, a cellulose based recyclable container is operable to provide insulating factors that exceed those associated with single layer construction techniques, i.e. waxed corrugated boxes for example. By combining an outer shell and inner shell with substantially rigid, cellulose based pressed insulating board or bat sandwiched in between, a cellulose based portable container may be provided in configurations useful for prolonged maintenance of the temperature of contents stored within its defined space. Further, and unlike typical plastic and foam core portable cooler designs, a cellulose based portable container may be recycled by most recycling programs, public or private, without the need for deconstruction and separation of it components. Also, a cellulose based portable container, in lieu of being recycled, whether comprised of cellulose or some other natural fiber or material, may be reasonably expected to biodegrade with prolonged exposure to natural elements in a landfill. Additionally, because embodiments of a cellulose based portable container are comprised of cardboard inner and outer shells and, further, are easily constructed via conversion techniques readily known in the art, various shapes and artwork for embodiments are easily customizable by techniques known in the art.

One embodiment of a cellulose based portable container is generally comprised of an inner shell having water resistant properties, an outer shell with a communicable lid, and insulating boards, slats or panels. Each component of such an embodiment is primarily constructed from a cellulose based material such as, but not limited to, corrugated cardboard, recycled newspaper, craft board, or the like. As a result, the entire product, although comprising multiple components, may be recycled in a typical community based recycling program.

Each component of the exemplary embodiment may be designed and converted from "sheet" forms per techniques currently known in the art. The outer and inner shell components may be cut from a flat sheet of cardboard, for instance, and creased such that each may communicate with the other to form a box-like shape with an integral lid. Likewise, the insulating board components may be cut in panels from a larger sheet of pressed cellulose such that each panel is operable to fit between the outer surface of the inner shell and the inner surface of the outer shell when said shells are in communication. Alternatively, in lieu of cutting, some embodiments of a cellulose based portable container may comprise insulating board components having physical properties that enable the component to be creased and/or shaped with means similar to the inner or outer shell components.

It should be noted that the particular shape of a cellulose based portable container is limited only by techniques known in the art and, therefore, while techniques and methodologies for construction of a cellulose based portable container may be novel in and of themselves, the particular shape of a cellulose based portable container or the process used to manufacture a given embodiment thereof should not limit the scope of the present invention. As non-limiting examples, the cellulose based portable container may be square, rectangular, cylindrical, etc. Additionally, embodiments of the cellulose based portable container may include multiple compartments or sub-spaces defined within the overall space of the container such as, but not limited to, an ice tray like arrangement having multiple pockets operable to receive contents or a lunch box like arrangement having a dedicated interior compartment for drink storage.

Another non-limiting example of an embodiment for a cellulose based portable container may take a form as described herein but additionally comprise contents within its defined space such as, but not limited to, canned liquids, foodstuff, dry ice, ice, etc. An embodiment comprising such contents may be sealed with a disposable or biodegradable seal such as, but not limited to, a starch based plastic. Such an embodiment could be used as a prepackaged cooler already filled with consumable product and conveniently ready for use. Still other variations may not require a sealing component.

Notably, the components of some embodiments of a cellulose based portable container may be comprised of 100% recycled and/or 100% recyclable materials, but such is not required of all embodiments of a cellulose based portable container and, therefore, specific percentages of recycled, recyclable or reclaimed material should not be construed to limit the scope of that which is claimed. Further, while some embodiments of a cellulose based portable container are primarily constructed of cellulose based materials, the particular title chosen for the invention should not be construed as to limit materials that may be used in the construction of embodiments of the invention. Moreover, it is anticipated that those skilled in the art may construct a cellulose based portable container from any naturally occurring fiber or material with biodegradable properties or recyclable value. A non-exhaustive list of possible alternative materials of construction for a cellulose based portable container includes biodegradable starch based plastics or other non-petroleum based plastics, polylactic acid, sugar cane fiber (bagasse), wool, cotton, or hemp.

As has been described, an advantage of a cellulose based portable container is that it may be easily recycled by most recycling programs. Embodiments are comprised of multiple layers of distinct components that combine to provide superior insulating properties that exceed other cellulose based products known in the art. Further, by virtue of using multiple layers, embodiments of a cellulose based portable container are structurally sound and operable to withstand repeated use. Moreover, the interior wall of the inner shell component of a cellulose based portable container may be water or liquid resistant or even waterproof in some embodiments and, further, even air-tight or substantially air-tight. Further, embodiments of a cellulose based portable container may be compostable, biodegradable, photodegradable, recyclable, or constructed of recycled content, though all embodiments may not exhibit all such properties.

Construction or design of a cellulose based portable container will be known to those skilled in the art and, therefore, particular shapes, sizes, or construction techniques associated with particular embodiments are not factors that may appropriately limit the scope of the invention. Creasing, folding, and adhesion techniques are typical in the construction of cellulose based products and, while possibly novel in and of themselves, are anticipated techniques for manufacture of a cellulose based portable container. For example, embodiments of the cellulose based portable container may be constructed such that the inner and outer shells are laminated, or otherwise bonded, to the insulating component. Additionally, embodiments may be designed such that the components are collapsible and operable to be communicated at the point of use to create a cellulose based portable container. Still other collapsible embodiments may be comprised such that the various components are pre-communicated and a cellulose based portable container may be configured at the point of use. Moreover, communication between the multiple components in various embodiments may be mechanical or chemical in nature as such is known in the art of cellulose based product manufacture.

Additional features and aspects that may be included in some embodiments of a cellulose based portable container include, but are not limited to, straps, handles, rope features, exterior treatments, locking mechanisms, separable lids, hinges, tethers, wheels, drain ports, feet, and viewing portals. The particular aspect or feature may be novel but the inclusion, or exclusion, of any such feature is not considered a limiting factor for the various embodiments.

Turning now to the figures, where like labels represent like elements throughout the drawings, various aspects, features and embodiments will be presented in more detail. The examples as set forth in the drawings and detailed description are provided by way of explanation and are not meant as limitations. The various embodiments thus include any modifications and variations of the following examples as come within the scope of the appended claims and their equivalents.

FIG. 1A is a perspective, front view of one embodiment of a cellulose based portable container, also referred to as an icebox 100 having an integrally hinged lid and cut out handles. While a cellulose based portable icebox is not limited to a box-like shape, the embodiment illustrated in FIG. 1A is comprised of an inner shell, outer shell, and insulating component that communicate such that a box-like embodiment is formed. Each panel or wall 110A-F of the embodiment has an interior surface, which represents a portion of the inner shell, an exterior surface, which represents a portion of the outer shell, and an insulating board or panel. In FIG. 1A, the exterior surface of walls 110A and 110D can be seen while the interior surface of walls 110B, 110C, 110E, and 110F are shown. Further, the particular embodiment depicted in FIG. 1A comprises a cut-out handle 115 such that the portion of the exterior shell representing walls 110D and 110B (not shown) as well as the insulating board communicating with the interior surfaces of said exterior shells are cut so that an operable handle feature is provided.

Also featured in the illustrated embodiment of FIG. 1A is a hinged (not shown) lid aspect. The lid of the embodiment is represented by panel 110F and is communicable via a creased hinge to the exterior surface of wall 110C. Unlike walls 110A-E, wall 110F (lid) is constructed such that a lip 120 extends out over an insulated panel 125. When the lid 110F is in full communication with the top edges of walls 110A-D, the lip 120 may be in contact with the top edges of walls 110A-D while the insulated panel 125 is recessed within the space defined by said walls. Advantageously, when the lid 110F is in full communication with the top edges of walls 110A-D, an enclosed, watertight, or water resistant, space is defined by the inner shell component and exposed surface of the lid's insulated panel 125.

Figure 1B:
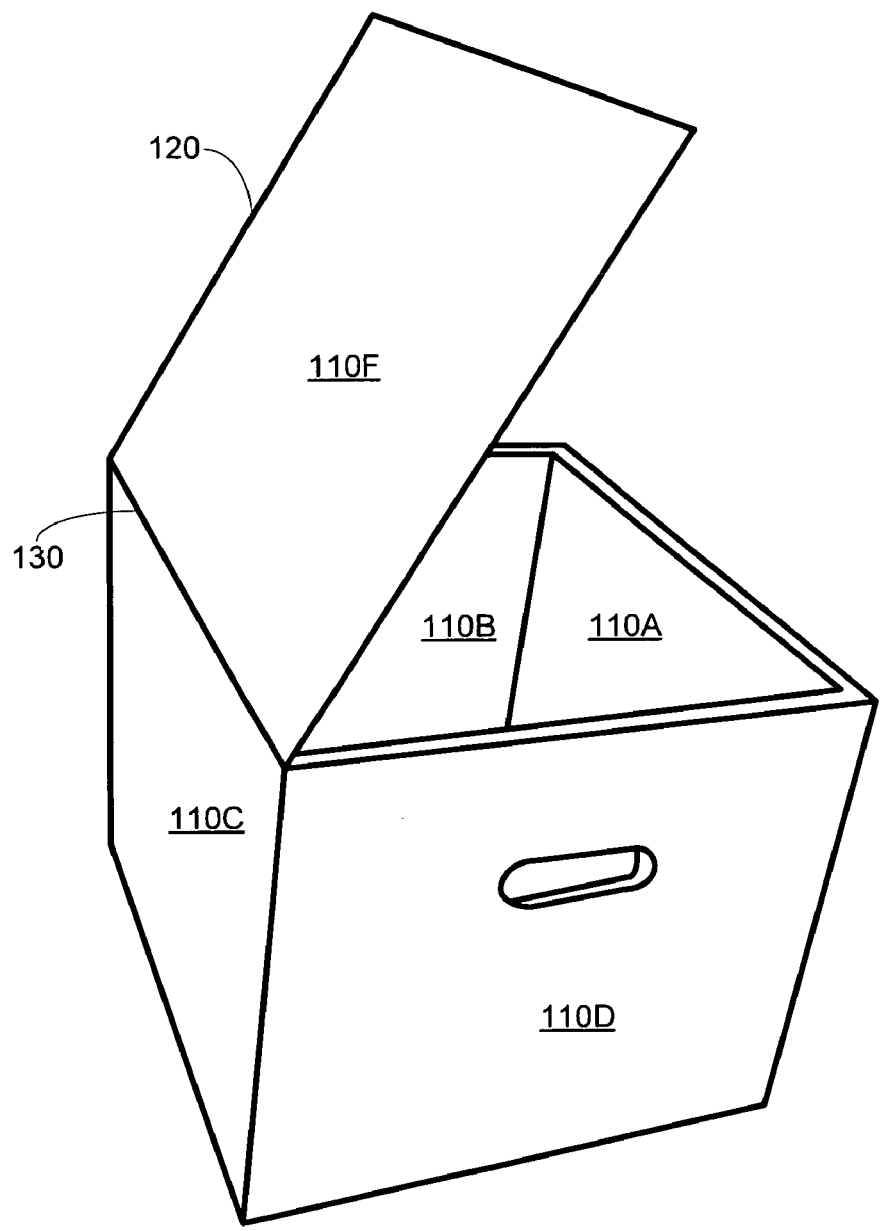
FIG. 1B is a perspective, rear view of one embodiment of a cellulose based portable container having an integrally hinged lid and cut out handles.

FIG. 1B is a perspective, rear view of the same embodiment of a cellulose based portable icebox 100 having an integrally hinged lid and cut out handles that is depicted in FIG. 1A. In the FIG. 1B, however, the exterior surface of walls 110C, 110D and 110F can be seen while the interior surface of walls 110A and 110B are shown. Also shown in the FIG. 1B illustration is the hinged 130 feature of the lid 110F. As has been described, the lid 110F in some embodiments, such as the one depicted herein, may be constructed such that its outer surface may be a continuation of the outer shell component and connected via a creased hinge 130 technique known in the art of cardboard box construction. Even so, it is important to note that the particular hinge 130 feature may vary with embodiments and, therefore, while possibly novel in and of itself, should not be construed as a limitation. As a non-exhaustive list of examples, it is anticipated that the hinge 130 aspect of a cellulose based portable icebox may be comprised of a strip of fabric, a series of rope loops, a ring, a spiral wound component, etc.

Figure 2:
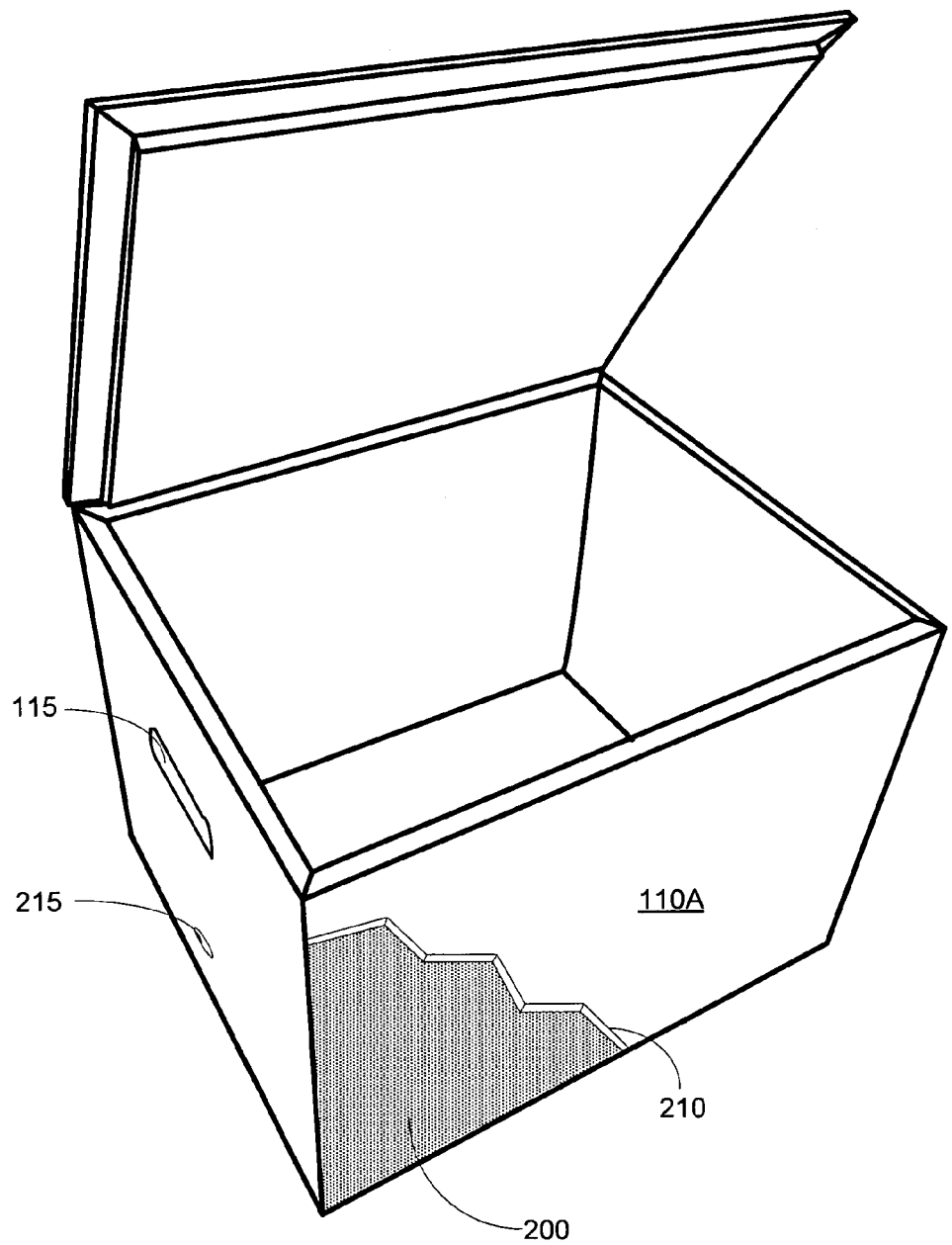
FIG. 2 is a perspective view of one embodiment of a cellulose based portable container with a cutaway outer shell to display a portion of the interior insulating board.

FIG. 2 is a perspective, frontal view of the same embodiment of a cellulose based portable icebox 100 having an integrally hinged lid and cut out handles that is depicted in FIG. 1A, further illustrating a cutaway outer shell in order to display a portion of the interior insulating board. As has been described prior, a cellulose based portable icebox is generally constructed of an inner shell nested within an outer shell and having an insulating board sandwiched between. As can be seen in the FIG. 2 illustration, a portion of the outer shell 210 functioning as the exterior surface of the front panel 110A is shown cutaway. Residing beneath the outer shell 210 and outside the inner shell is an insulating board component 200 comprised of a pressed cellulose. As has been described, the insulating board for some embodiments is comprised of a material that may be recycled in conjunction with the inner and outer shell components without the requirement that the icebox be deconstructed. For example, in some embodiments, the inner and outer shell components are constructed of corrugated cardboard and the insulating board is constructed of a pressed, recycled cellulose board. Further, while the insulating board component 200 is shown within panel 110A, it should be understood that the insulating board component 200 is also within each of the other walls, floor and lid, that operate to comprise the particular embodiment depicted.

Also seen in FIG. 2, is a drain plug feature 215 operable to be sealed or opened such that liquids contained within the icebox may be either retained or drained. Drain plug features are well known in the art of portable iceboxes and, while particular drain plug designs may be novel in and of themselves, the presence or absence of a drain plug should not be considered a limiting factor for a cellulose based portable icebox. Further, it is anticipated that the materials of construction for a drain plug may be recyclable along with the other components of the container, however, such is not necessarily required. Drain plugs and other features in some embodiments may be of an inconsequential mass such that the presence of such a feature in a non-recyclable form would not necessitate the deconstruction of the container prior to recycling.

FIGS. 3A and 3B are perspective views of an icebox 300 and lid 320 that combine to depict another embodiment of a cellulose based portable container. Notably, FIG. 3A is an example of a lid 320 constructed of a corrugated cardboard, or other suitable material, that is well known in the art of box making. The lid 320 comprises no insulating board component, as shown, though other embodiments may comprise an insulating board. The illustration is offered herein as an example that all embodiments of a cellulose based portable container may not comprise an insulating board component within all surfaces that define the embodiment. The particular lid 320 shown in FIG. 3A is equipped with sides that extend perpendicularly downward from the edges defined by the lid 320 surface such that it is operable to communicate as a lid for the icebox depicted in FIG. 3B.

The icebox depicted in FIG. 3B is substantially constructed per that which has been outlined relative to previous embodiments. The particular shape of the icebox shown in FIG. 3B, however, is tapered in nature and offered herein to illustrate one possible variation in shape that may be a feature of some embodiments. Advantageously, the tapered inner 310 and outer 305 walls of the present embodiment are useful for stacking multiple cellulose based portable iceboxes in a nested fashion. Other variations in shape are anticipated as associated construction techniques are well known in the art and, therefore, while shape variations may serve novel functions such as reduced space requirements for shipping of multiple units, the specific shape chosen by those skilled in the art should not be construed as a limitation.

FIGS. 4A and 4B are offered as examples of possible variations in handle aspects that may be employed by various embodiments of a cellulose based portable container. FIG. 4A is a close-up view of a cutout handle design 400A as has been reference for previously described embodiments. Seen in FIG. 4A, the outer surface 430A of the inner shell component is shown intact. Advantageously, keeping the inner shell component intact operates to maintain the integrity of the inner shell's water tightness aspects. Even so, keeping the inner shell intact is not required in all embodiments. Also shown in FIG. 4A is the exposed insulating board component 420A and cut outer shell 410A.

FIG. 4B is an alternative handle design offered herein as a non-limiting example of a possible variation for a handle feature 400B that may be comprised in some embodiments. In FIG. 4B, a rope-like component 420B is shown extending from holes 410B cut into at least the outer shell of the container. Notably, the holes may be cut just in the outer shell, or through the outer shell and insulating board, or all the way through the outer shell and inner shell. Regardless, fastening techniques for a rope-like handle are known in the art and may comprise, as a non-limiting example, a washer type component fastened at each end of the rope handle 420B such that the rope handle 420B ends cannot pull back through the holes 410B. Further, as has been described, it is anticipated that the particular choice of material for the rope may vary with the embodiment and should not be construed as a limiting factor of scope. The material may be recyclable by the same processes used to recycle other components in a given embodiment or, alternatively, the handle component may comprise so little mass that it would be considered inconsequential in the recycling process such that deconstruction of the embodiment would not be required for recycling.

Moving now to FIGS. 5 through 8, a typical design and construction process that is known in the art and may be applied for the construction of some embodiments of a cellulose based portable container is described.

Figure 5:
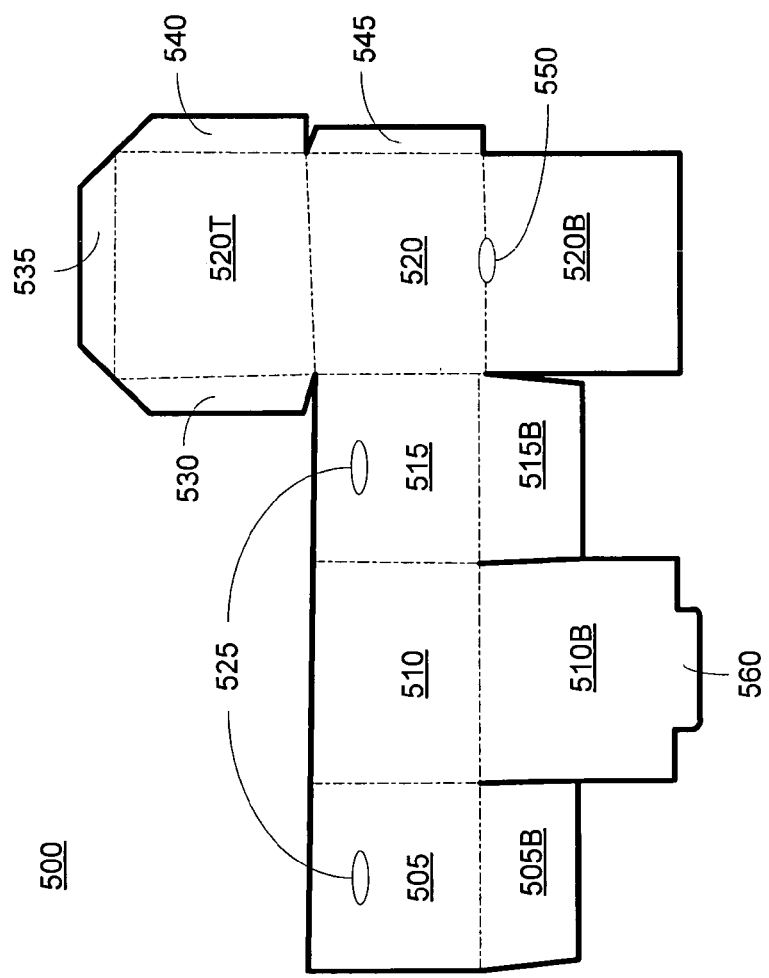
FIG. 5 is a two dimensional view of an exemplary design for an outer shell included in some embodiments of a cellulose based portable container that have cut out handle features, illustrating the crease lines prior to conversion.

FIG. 5 is a two dimensional view of an exemplary design for an outer shell 500 included in some embodiments of a cellulose based portable container that are cube-like in shape, have integral lids and cut out handle features, illustrating the crease lines prior to conversion. In some embodiments, the outer shell component may be converted from a flat sheet of corrugated cardboard or another suitable material. Depicted in FIG. 5 is an outer shell component that has been cut from a flat sheet of corrugated cardboard but has not yet been converted into a finished outer shell. The crease lines are represented by dotted lines in the figure and are operable to provide a bending point during the conversion process. Once converted, panels 505, 510, 510B, 515, 520 and 520T will function as exterior walls for an outer shell component.

To convert into an outer shell, the component depicted in FIG. 5 is folded along the crease lines. Panel 505B is folded to define a plane perpendicular to panel 505. Next, panel 505 is folded to define a plane perpendicular to panel 510 which is, in turn, folded perpendicular to panel 515. Subsequently, panel 515 is folded perpendicularly to panel 520 thereby providing for the edge of panel 505 to communicate with the surface of panel 520. Tab 545 can then be folded to communicate with the outer surface of panel 505 and glued in place, as is known in the art. Next, panel 515B can be folded perpendicular to panel 515 such that it is in plane with previously folded 505B. Panel 520B is folded to be in a plane parallel with previously folded panels 505B and 515B and, finally, to complete the bottom surface of the outer shell of the exemplary embodiment, panel 510B is folded into a parallel plane perpendicular to previously folded panels 505B, 515B, and 520B such that tab 560 may be received and retained by retention feature 550. Tabs 530, 535 and 540 are folded and glued such that each communicates with the underside of integrally hinged lid 520T. Cutout style handles 525 are depicted in panels 505 and 515. Thus, an outer shell for an exemplary embodiment of a cellulose based portable container is constructed.

Once the outer shell has been constructed for the exemplary embodiment, the inner shell may be converted. Moving now to FIG. 7, a two dimensional view of an exemplary design for an inner shell 700 included in some embodiments of a cellulose based portable container is depicted, illustrating the crease lines prior to conversion. Using substantially the same methodology of conversion as described relative to the outer shell in FIG. 5, the inner shell form may be cut from a flat piece of corrugated cardboard, or some other suitable material, as is known in the art. The crease lines are operable to provide a folding or bending point. To convert the inner shell, which in most embodiments will comprise a water resistant surface, panels 705L, 705R, 705BK and 705F are folded upward relative to bottom panel 705B such that each occupies a plane substantially perpendicular to bottom panel 705B. Once each panel is folded upward, panels 710 may crease to form triangles extending diagonally outward from the seams defined by the vertically communicating edges of panels 705L, 705R, 705BK and 705F. The triangles may then be folded behind the outside walls of adjacent panels and glued, stitched with a cellulose based thread or otherwise connected, if necessary. Thus, an inner shell for an exemplary embodiment of a cellulose based portable container is constructed.

Figure 6:
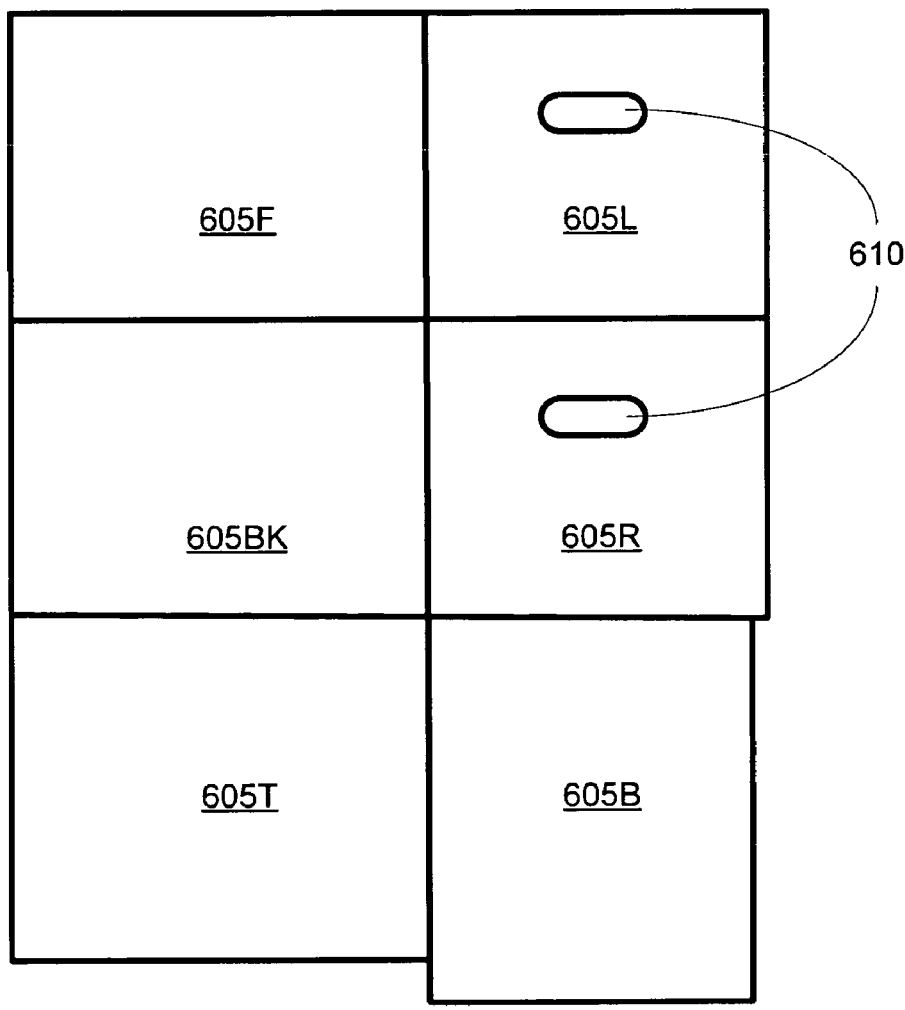
FIG. 6 is a two dimensional illustration of an exemplary pattern for conversion of a pressed cellulose insulating board into multiple insulating panels operable to be contained within some embodiments of a cellulose based portable container.
Figure 7:
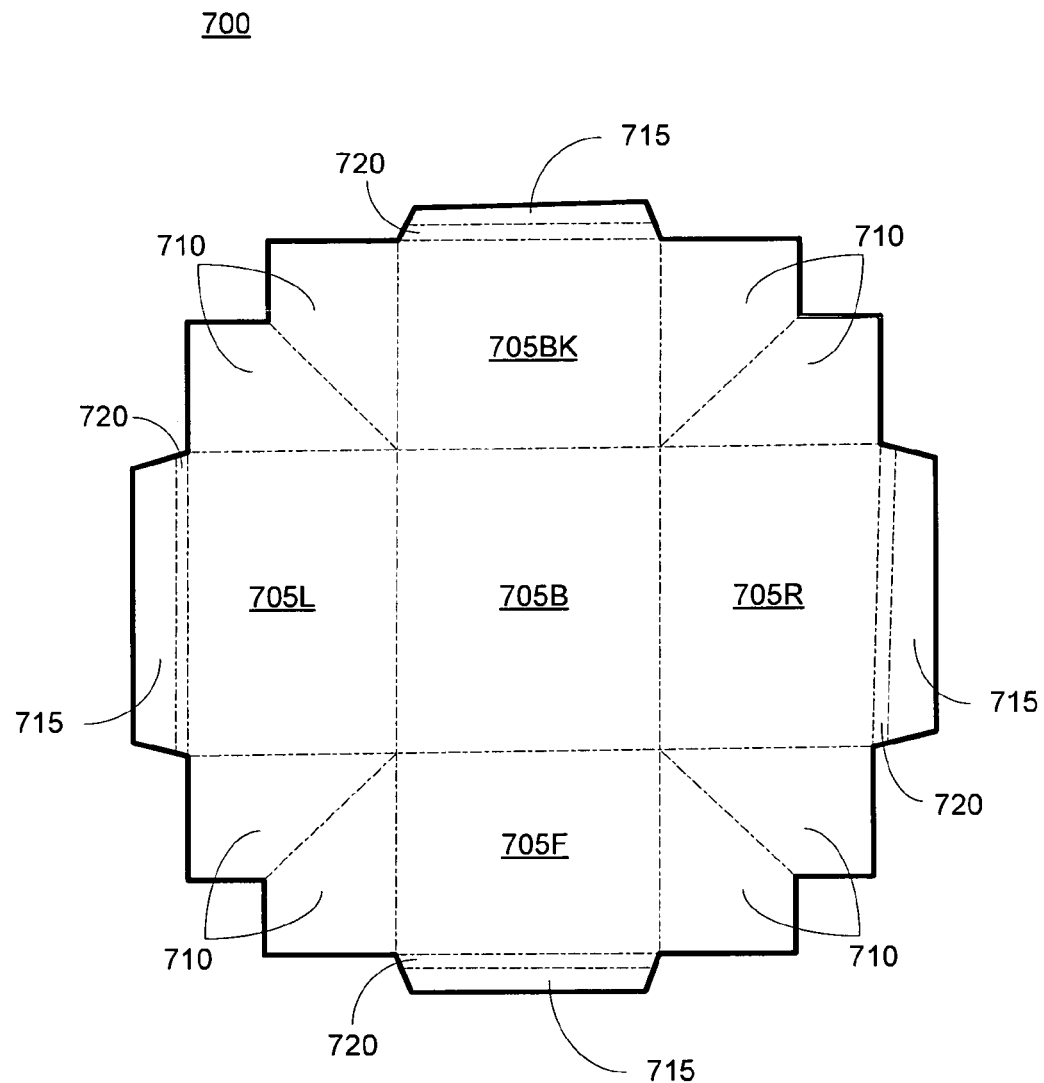
FIG. 7 is a two dimensional view of an exemplary design for an inner shell included in some embodiments of a cellulose based portable container, illustrating the crease lines prior to conversion.

Once the outer shell and inner shell has been constructed for the exemplary embodiment, insulating panels can be fitted to the outside walls of the inner shell. Moving back to FIG. 6, depicted is a two dimensional illustration of an exemplary pattern for conversion of a pressed cellulose insulating board 600 into multiple insulating panels operable to be contained within some embodiments of a cellulose based portable container. As shown, the front 605F, back 605BK, left and right side 605L-R, bottom 605B and top 605T insulating board panels may be converted from a flat sheet of insulating board per techniques known in the art. Each board, with the exception of the top board 605T and bottom board 605B, is placed outside the inner shell such that each communicates with the appropriate outer wall of the inner shell and the tabs 715 of the inner shell (shown in FIG. 7) are folded over the associated insulating board and fastened per techniques known in the art.

Once the insulating board panels 605L and 605R (with handle cutout 610) along with panels 605BK and 605F are in communication with the inner shell, panel 605B may be placed at the bottom of previously converted outer shell 500. Next, previously converted inner shell 700 along with the installed insulating boards may be nested into the outer shell and secured via techniques known in the art.

Figure 8:
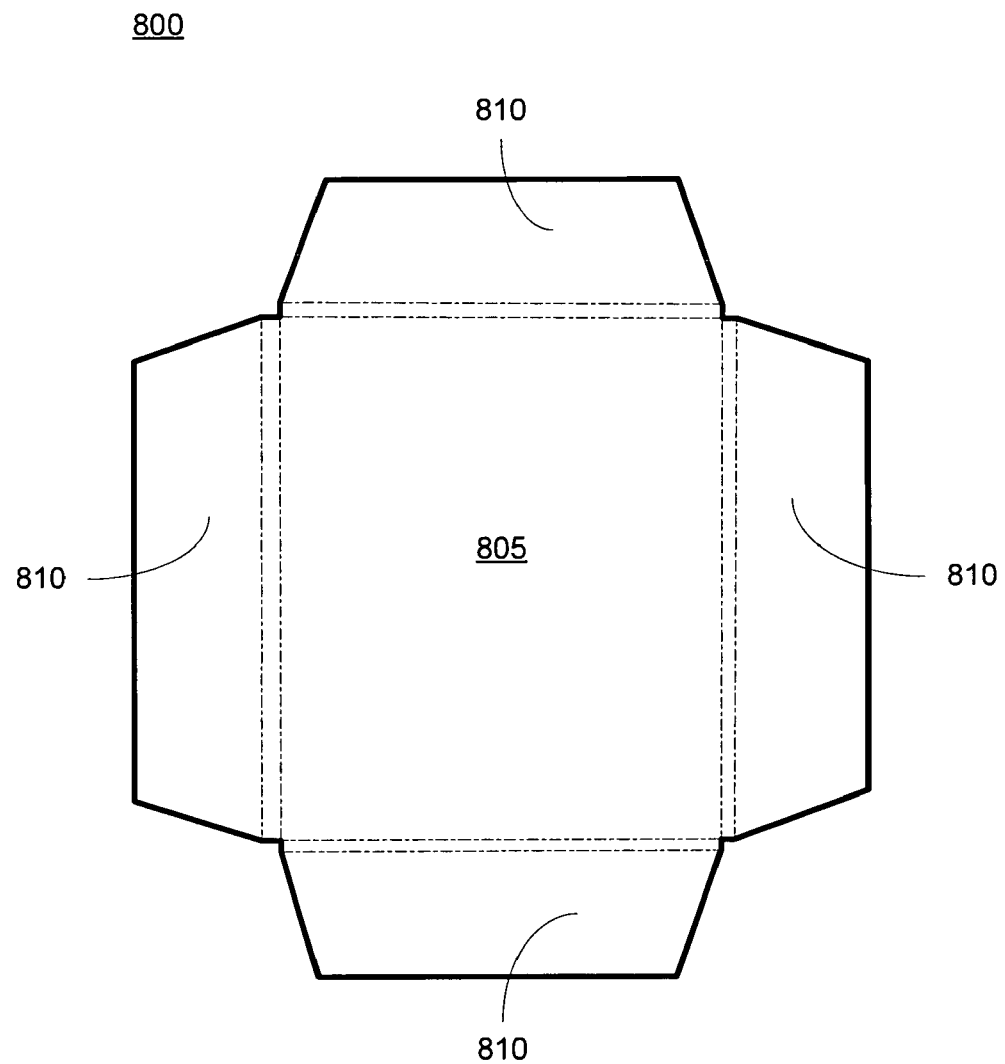
FIG. 8 is a two dimensional view of an exemplary design for a lid insulation wrap included in some embodiments of a cellulose based portable container, illustrating the crease lines prior to conversion.

Moving now to FIG. 8, a two dimensional view of an exemplary design for a lid insulation wrap 800 included in some embodiments of a cellulose based portable container is depicted, illustrating the crease lines prior to conversion. Per the conversion methodology described prior, the final insulating board 605T may be communicated with the interior surface 805 of the lid insulation wrap 800 and secured by folding flaps 810 over the board. The flaps 810 may be fastened via techniques known in the art, such as gluing. The lid insulation wrap 800 and insulating board 605T assembly may be fastened to the underside of the integral lid 520T associated with the outer shell 500, thereby completing the assembly of an exemplary embodiment of a cellulose based portable container.

Although the inner shell and the outer shell have been described as two separate components, it will be appreciated that in some embodiments, the inner shell and outer shell may be formed from a single sheet of material, that once folded will create an inner and outer shell. In such an embodiment, the insulating components may be attached or affixed to the appropriate locations of the sheet prior to being folded, or at critical junctures in the folding process.

In other embodiments, rather than using insulating panels, cellulose based insulation can be sprayed or blown into a space or cavity defined between the inner shell and the outer shell. Yet in other embodiments, rather than boards or panels, slats of insulating material may be used to help maintain the integrity (such as rigidness) of the container, as well as the shape. The slats allow the gap between the inner shell and the outer shell to be separated and thus, air operates as the insulation between the inner and outer shells. Rather than slats, simple plugs or spacers may be utilized. In addition, all materials between the inner shell and the outer shell may be eliminated in some embodiments and simply air is used as the insulation in the space between the shells.

It will also be appreciated that in some embodiments, rather than having a water tight structure for the inner shell, an insert or liner may be used to create the water tight structure. For instance, a structure formed by pressing a cellulose based material into the appropriate shape may provide the water tight capabilities, if required. The pressed structure may be constructed to slide into the interior compartment defined by the inner shell and either completely wall the interior compartment, only wall the lower portion of the interior compartment, or simply divide the interior compartment into two or more chambers.

In some embodiments, the seams of the outer shell, and possible the inner shell, can be perforated to facilitate the ability to break the container down to a flat form when the container is retired.

It will be appreciated that some embodiments may only include an interior shell with the insulating panels or boards attached to the outside of the shell. In other embodiments, only an outer shell may be used with the insulating panels or boards attached to the interior walls of the outer shell.

It will also be appreciated that multiple shells may be utilized to provide even greater thermal characteristics. For instance, an outer shell, an inner shell and one or more middle shells may be used in one embodiment. Insulating components can be included or excluded between the various shells. Advantageously, this structure can be used to further improve the insulating or thermal ability of the container.

It will also be appreciated that the above-presented aspects and features may also be employed in a bag-type scenario. For instance, the outer shell and inner shell may be constructed out of substantially thin material and formed into a multi-layer bag structure. The insulating material, either as a board or loose form can then be placed between the layers. When the insulating bag is not in use, it lays flat or may even be foldable. When in use, the bag opening can be opened and items placed into the interior of the insulated bag. Various means can be used to provide a closing mechanism for the bag opening. Advantageously, such a structure provides a recyclable insulated bag that can be used for shopping, grocery transport, fast food transport, etc.

The various embodiments of a container have been described using detailed descriptions thereof that are provided by way of example and are not intended to be limitations. The described embodiments comprise different features, not all of which are required in all embodiments. Some embodiments utilize only some of the features or possible combinations of the features. Variations of embodiments that are described and embodiments comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A device for impeding the transfer of energy, the device being comprised of:
   an inner shell defining a first interior space and a single opening that provides access to the first interior space, wherein the first interior space and single opening are defined by a bottom surface and a plurality of side wall surfaces extending in planes substantially perpendicular to a plane defined by the bottom surface;
   wherein each of the side wall surfaces further comprises a tab component having a first part and a second part at the end distal to the bottom surface, wherein the first part is formed to be positioned in a plane substantially perpendicular to the plane defined by the side wall and the second part is formed to be positioned in a plane substantially parallel to the plane defined by the side wall, wherein a gap is formed between the second part and the sidewall;
   an outer shell defining a second interior space with an opening that provides access to the second interior space, wherein the second interior space is sufficiently large to receive the inner shell; and
   an insulating component comprising a recyclable, cellulose based material, the insulating component is positioned between the gap and a space defined by an inner surface of the outer shell and an outer surface of the inner shell when the inner shell is inserted into the second interior space.

2. The device of claim 1, wherein the first interior space is operable to contain a liquid.

3. The device of claim 1, further comprising a separable lid component that can be moved between an open position and a closed position, wherein the separable lid component is configured to close the opening defined by the inner shell.

4. The device of claim 1, further comprising an integral lid to the outer shell that can be moved between an open position and a closed position, wherein the integral lid is configured to close the opening defined by the inner shell.

5. The device of claim 4, wherein the integral lid is hinged to the outer shell via a crease mechanism.

6. The device of claim 1, wherein each of the inner shell, outer shell and insulating component is comprised of substantially the same material.

7. The device of claim 6, wherein at least one of the inner shell, outer shell and insulating component is comprised of a material that contains recycled materials.

8. The device of claim 1, wherein at least one of the inner shell, outer shell and insulating component is comprised of a material that contains plastic and cellulose.

9. The device of claim 1, wherein at least one of the inner shell, outer shell and insulating component is comprised of a material that contains natural fibers.

10. The device of claim 1, wherein the outer surface of the outer shell is suitable for graphic printing.

11. The device of claim 1, wherein the outer shell further comprises at least one cutout area operable as a handle.

12. The device of claim 1, wherein the outer shell further comprises at least one cutout area operable to accommodate a strap handle.

13. The device of claim 12 further comprising a strap handle, wherein the strap handle is made of a recyclable material.

14. The device of claim 1, wherein the shape of the device is suitable for nesting with similar devices.

15. The device of claim 1, wherein at least one of the inner shell, outer shell and insulating component is comprised of a material that is biodegradable.

16. The device of claim 1, wherein at least one of the inner shell, outer shell and insulating component is comprised of a recyclable, cellulose based material.

17. The device of claim 1, wherein the insulating component is comprised of a substantially rigid panel manufactured from pressed cellulose.

* * * * *